US008588143B2

(12) United States Patent
Xiong (10) Patent No.: US 8,588,143 B2
(45) Date of Patent: Nov. 19, 2013

(54) METHOD AND SYSTEM FOR CONTROLLING ACCESS OF USER EQUIPMENT TO NETWORK

(75) Inventor: Chunshan Xiong, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/264,618

(22) PCT Filed: Apr. 16, 2010

(86) PCT No.: PCT/CN2010/071824
§ 371 (c)(1),
(2), (4) Date: Dec. 13, 2011

(87) PCT Pub. No.: WO2010/118700
PCT Pub. Date: Oct. 21, 2010

(65) Prior Publication Data
US 2012/0140710 A1  Jun. 7, 2012

(30) Foreign Application Priority Data
Apr. 17, 2009  (CN) .......................... 2009 1 0082004

(51) Int. Cl.
*H04W 76/02* (2009.01)
(52) U.S. Cl.
USPC ......................................... 370/328; 370/338

(58) Field of Classification Search
USPC ............................... 370/328, 329, 338, 395.2
See application file for complete search history.

(56) References Cited

U.S. PATENT DOCUMENTS

| 7,299,272 | B2* | 11/2007 | Karjanlahti | .................... 709/220 |
| 2005/0237990 | A1* | 10/2005 | Uskela | ........................... 370/349 |
| 2007/0258427 | A1* | 11/2007 | Shaheen et al. | ................ 370/338 |
| 2009/0213749 | A1* | 8/2009 | Han | .............................. 370/252 |

FOREIGN PATENT DOCUMENTS

| CN | 1499762 | 5/2004 |
| CN | 1625152 | 6/2005 |

* cited by examiner

*Primary Examiner* — Brian D Nguyen
(74) *Attorney, Agent, or Firm* — Fay Kaplun & Marcin, LLP (57) ABSTRACT

A method and a system for controlling user equipment (UE) access to a network are used for controlling the access of a UE to a local network. The method includes: a Serving General Packet Radio Service Support Node (SGSN) obtains the information of the local network to which the UE requests access via an Activate Packet Data Protocol Context initiated by the UE; the SGSN instructs a Home Node B (HNB) to establish a local network bearer for the UE according to the information of the local network to which the UE requests to access; the HNB grants the UE access to the local network by establishing a local network wireless bearer for the UE based on the instruction of the SGSN.

17 Claims, 3 Drawing Sheets

METHOD AND SYSTEM FOR CONTROLLING ACCESS OF USER EQUIPMENT TO NETWORK

The present application is a US National Stage of International Application No. PCT/CN2010/071824, filed 16 Apr. 2010, designating the United States, and claiming priority to Chinese Patent Application No. 200910082004.8 filed 17 Apr. 2009.

FIELD OF THE INVENTION

The present invention relates to the field of communications and particularly to a method and system for controlling an access of a User Equipment (UE) to a network.

BACKGROUND OF THE INVENTION

When a UE needs to be attached to a General Packet Radio Service (GPRS) or an Evolved packet System (EPS), if the UE is going to establish a Packet Data Network (PDN) connection, the UE shall initiate an Activate Packet Data Protocol (PDP) Context procedure, that is, the UE can establish a PDN connection by performing the Activate Packet Data Protocol (PDP) Context procedure.

If the UE initiates a PDN connection, the UE shall transmit an Activate Packet Data Protocol (PDP) Context Request message to a Serving GPRS Support Node (SGSN) in a core network. The Activate PDP Context Request message includes an Access Point Name (APN), a PDN Type, Protocol Configuration Options and a Request Type. The APN and the Request Type are optional parameters. If the UE requests for establishment of a new PDN connection, the Activate PDP Context Request message does not include the Request Type. If the UE supports a handover from a non-3$^{rd}$ Generation Partner Project (3GPP) access to an access of Universal Terrestrial Radio Access Network (UTRAN) or Global System of Mobile communication (GSM)/Enhanced Data rate for GSM Evolution (EDGE) Radio Access Network (GERAN), the Request Type in the Activate PDP Context Request message is set as Handover Request. This characteristic is supported only in the specifications of Release 8 and subsequent releases. That is, the Activate PDP Context Request message includes the Request Type that is set as Handover Request only for a handover of the UE from the non-3GPP access to the UTRAN/GERAN in the specifications of Release 8 and subsequent releases.

In the prior art, an Internet Protocol (IP)-enabled UE can access a mobile operator core network via a Home NodeB (HNB) through an Activate Packet Data Protocol Context Request procedure. However, such a new demand for a Home NodeB (HNB) of Release 9 (R9) has been proposed in the 3GPP TS22.220 standard that an IP-enabled UE shall be capable of being connected with an IP-enabled device at home through the HNB, but no specific solution has been presented so far.

SUMMARY OF THE INVENTION

Embodiments of the invention provide a method and system for controlling an access of a UE to a network to control an access of the UE to a local network.

An embodiment of the invention provides a method for controlling an access of a UE to a network, which includes:

acquiring, by a Serving General Packet Radio Service (GPRS) Support Node (SGSN), information of a local network, to which an access is requested by the UE, through an Activate Packet Data Protocol Context procedure initiated by the UE;

instructing, by the SGSN, a home NodeB according to the information of the local network, to which an access is requested by the UE, to establish a bearer of the local network for the UE; and establishing, by the home NodeB, a radio bearer of the local network for the UE in response to the instruction of the SGSN to enable an access of the UE to the local network.

An embodiment of the invention provides a method at an SGSN side for controlling an access of a User Equipment (UE) to a network, which includes:

acquiring, by a Serving General Packet Radio Service (GPRS) Support Node (SGSN), information of a local network, to which an access is requested by the UE, through an Activate Packet Data Protocol Context procedure initiated by the UE; and instructing, by the SGSN, a home NodeB according to the information of the local network, to which an access is requested by the UE, to establish a bearer of the local network for the UE to enable an access of the UE to the local network.

An embodiment of the invention provides a method at a home NodeB side for controlling an access of a User Equipment (UE) to a network, which includes:

establishing, by a home NodeB, a radio bearer to a local network for the UE in response to an instruction, transmitted from an SGSN, to establish a bearer of the local network for the UE, to enable an access of the UE to the local network; and controlling, by the home NodeB, transmission of data between the UE and the local network through the radio bearer.

An embodiment of the invention provides a communication system including:

a Serving General Packet Radio Service (GPRS) Support Node (SGSN) configured to acquire information of a local network, to which an access is requested by a User Equipment (UE), through an Activate Packet Data Protocol Context procedure initiated by the UE, and instruct a home NodeB according to the information of the local network, to which an access is requested by the UE, to establish a bearer of the local network for the UE; and the home NodeB configured to establish a radio bearer of the local network for the UE in response to the instruction of the SGSN to enable an access of the UE to the local network.

An embodiment of the invention provides a user equipment including:

a local network access requesting unit configured to transmit information of a local network, to which an access is requested by the user equipment, to a home NodeB through an Activate Packet Data Protocol Context procedure initiated by the user equipment; and a data transmission unit configured to perform data transmission with the local network over a radio bearer of the local network, established by the home NodeB for the user equipment, under the control of the home NodeB.

An embodiment of the invention provides an SGSN including:

an information acquisition unit configured to acquire information of a local network, to which an access is requested by a User Equipment (UE) through an Activate Packet Data Protocol Context procedure initiated by the UE; and an instruction unit configured to instruct a home NodeB according to the information of the local network, to which an access is requested by the UE, to establish a bearer of the local network for the UE.

An embodiment of the invention provides a home NodeB including:

a bearer establishment unit configured to establish a radio bearer to a local network for a UE in response to an instruction, transmitted from an SGSN, to establish a bearer of the local network for the UE to enable an access of the UE to the local network; and a data transmission control unit configured to control transmission of data between the UE and the local network through the radio bearer.

The SGSN according to the embodiment of the invention acquires the information of the local network, to which an access is requested by the UE, through the Activate Packet Data Protocol Context procedure initiated by the UE, and instructs the home NodeB according to the information of the local network, to which an access is requested by the UE, to establish a bearer of the local network for the UE; and the home NodeB establishes a radio bearer of the local network for the UE in response to the instruction of the SGSN to enable an access of the UE to the local network, so that the UE can access the local network through the home NodeB, thus enabling intercommunication of the UE with an IP-enabled device in the local network (a home network or a local Internet network) through the home NodeB.

DETAILED DESCRIPTION OF THE EMBODIMENTS

Embodiments of the invention provide a method and system for controlling an access of a UE to a network to control an access of the UE to a local network.

The local network as mentioned in the embodiments of the invention refers to a home network or a local Internet network connected with a Home NodeB (HNB).

The home network refers to a local area network composed of home network devices connected with the HNB, e.g., one or more home computers, network printers, network video devices, and network cameras.

The local Internet network refers to a network connected with the HNB and capable of accessing the Internet.

Figure 1:
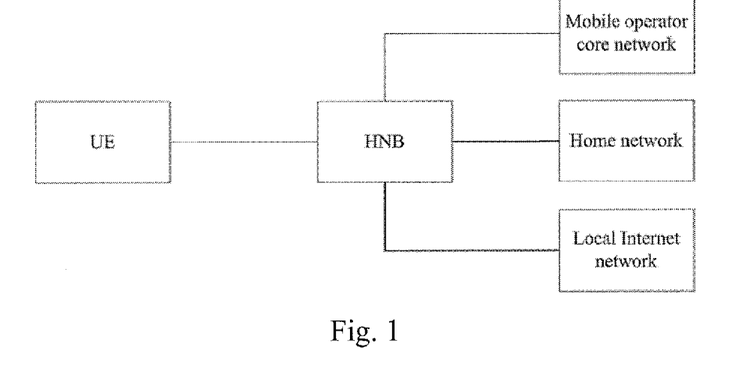
FIG. 1 is a schematic diagram that a UE accesses a mobile operator core network and a local network through a home NodeB according to an embodiment of the invention.

As illustrated in FIG. 1, a UE can not only be connected to a mobile operator core network through an HNB but also be connected to a home network or a local Internet network through the HNB by means of a technical solution according to an embodiment of the invention.

Figure 2:
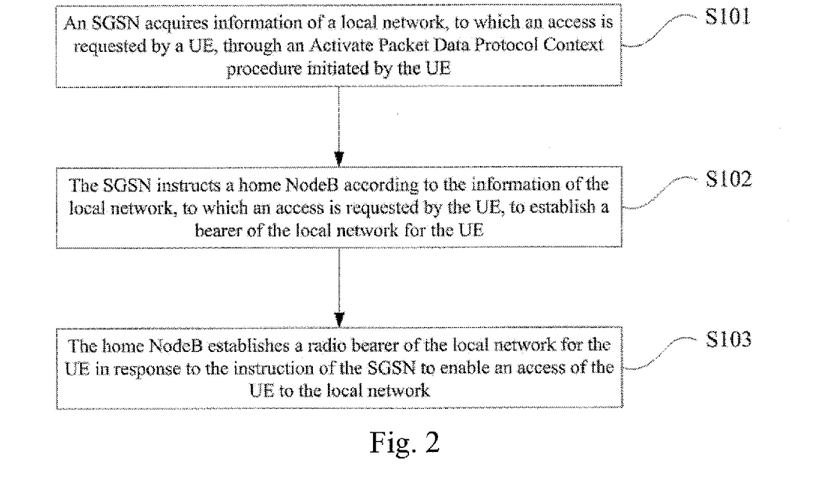
FIG. 2 is a schematic diagram of a general flow of controlling an access of a UE to a local network according to an embodiment of the invention.

Referring to FIG. 2, a method for controlling an access of a UE to a local network according to an embodiment of the invention generally includes the following steps.

S101. An SGSN acquires information of a local network, to which an access is requested by a UE, through an Activate Packet Data Protocol Context procedure initiated by the UE.

S102. The SGSN instructs a home NodeB according to the information of the local network, to which an access is requested by the UE, to establish a bearer of the local network for the UE.

S103. The home NodeB establishes a radio bearer of the local network for the UE in response to the instruction of the SGSN to enable an access of the UE to the local network.

The local network as mentioned in the embodiment of the invention includes two types of networks, i.e., a home network and a local Internet network, each of which may include one or more networks, and the HNB may support concurrent accesses of the UE to a plurality of home networks or a plurality of local Internet networks, and therefore the UE may choose to access one network of a specific type or access concurrently a plurality of networks of a specific type.

If each type of network includes only one network, that is, only one network is allowed for the same type of local network to which the HNB is connected, a local network may be indicated simply by indicating the type of the local network, and the information of the local network, to which an access is requested by the UE, may be information on the type of the local network, to which an access is requested by the UE.

However, when a plurality of user accessible networks are allowed for the same type of local network to which the HNB is connected, a specific user accessible local network shall be indicated, and therefore the information of the local network, to which an access is requested by the UE, may be information on an Access Point Name (APN) of the local network, to which an access is requested by the UE, to indicate one or more specific local networks, to which an access is requested by the UE.

The information of the local network, to which an access is requested by the UE, in the embodiment of the invention is informed to the network side by the UE through the Activate Packet Data Protocol Context procedure initiated by the UE, particularly may be included in an Activate PDP Context Request message transmitted from the UE.

Preferably, when only one network is allowed for the same type of local network to which the HNB is connected, the Activate PDP Context Request message may indicate the local network, to which an access is requested by the UE, simply by indicating the type of the local network. However, when a plurality of networks are allowed for the same type of local network to which the HNB is connected, the Activate PDP Context Request message may carry information on an APN of the local network to indicate the local network, to which an access is requested by the UE.

An detailed description thereof is given below.

The UE finishes establishment of a Packet Data Network (PDN) connection after the UE is attached to an EPS or GPRS system through the HNB utilizing an access of UTRAN/GERAN. As specified in the specification, if the UE is going to establish another Packet Data Network (PDN) connection to the local network, the UE shall inform the SGSN that the PDN connection to be established is connected to the local network instead of a PDN connection corresponding to a traditional SGi or Gi interface. The PDN connection corresponding to the tradition SGi or Gi interface involves the use of a Serving Gateway (Serving GW) and a Packet Data Network Gateway (PDN GW) or a Gateway GPRS Support Node (GGSN) in a core network, while the local network does not involve the use of the serving GW and the PDN SW or the GGSN in the core network. As illustrated in FIG. 1, after the UE is connected to the local network, uplink data is transmitted from the UE to the HNB and then to the local network, and downlink data is transmitted from the local network to the HNB and then to the UE.

Figure 3:
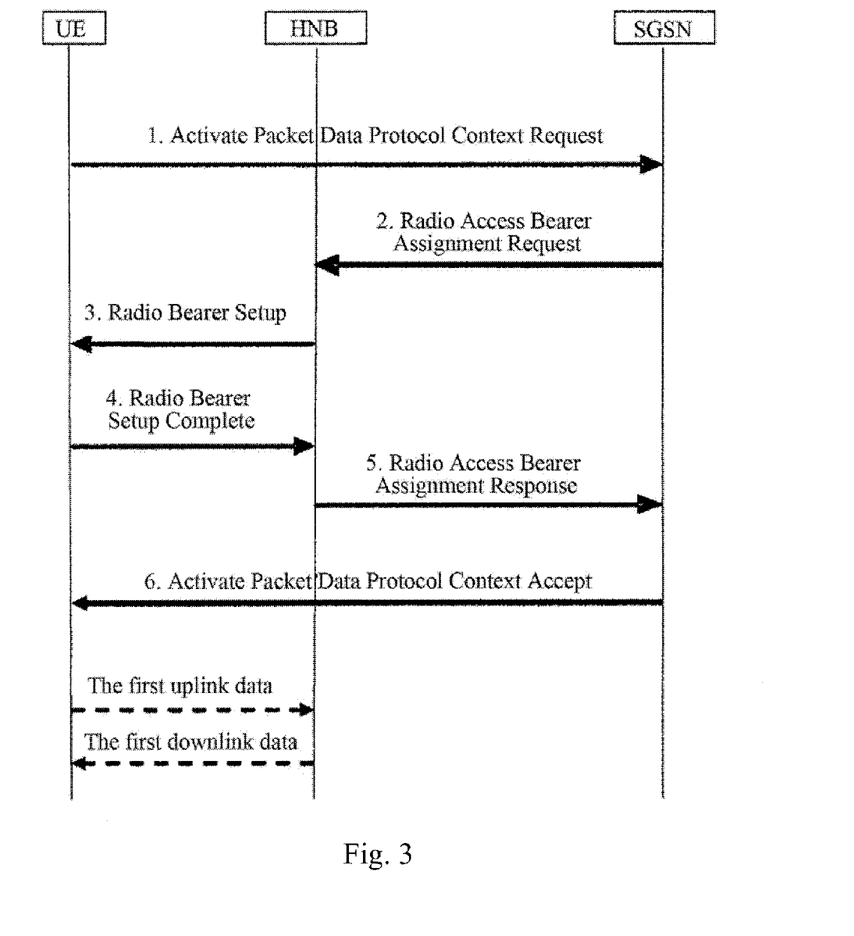
FIG. 3 is a schematic diagram of an Activate PDP Context procedure according to an embodiment of the invention.

As illustrated in FIG. 3, a UE requested PDN connection (Activate PDP Context) procedure according to an embodiment of the invention includes the following steps.

1. If a UE is going to initiate a PDN connection, the UE transmits an Activate PDP Context Request message to an HNB, and the HNB forwards the Activate PDP Context Request message to a Serving GPRS Support Node (SGSN).

It shall be noted that a Home NodeB Gateway (HNB GW) may be provided between the HNB and the SGSN. If an HNB GW is provided, the HNB GW transparently transmits messages between the UE and the SGSN, so that in the procedure, all of the messages are transparent to the HNB GW, that is, the HNB GW does not parse any message transmitted between the UE and the SGSN but simply forwards the messages between the UE and the SGSN.

Furthermore, the UE creates a first Packet Data Protocol (PDP) Context under the PDN connection through the Activate Packet Data Protocol (PDP) Context Request message, that is, the Activate Packet Data Protocol (PDP) Context Request message is used to create a first PDP Context under a PDN connection, and subsequently if the UE is going to create another PDP Context under the PDP connection, the UE may initiate a secondary Packet Data Protocol Context activation procedure, and the UE transmits an Activate Secondary Packet Data Protocol (PDP) Context Request message. In analogy to this, if the UE is going to create an $n^{th}$ (n is an integer larger than 1) PDP Context under the same PDN connection, the UE may initiate a secondary Packet Data Protocol Context activation procedure, and a message used by the UE in the procedure is an Activate Secondary Packet Data Protocol (PDP) Context Request message. Furthermore, the Activate Secondary Packet Data Protocol (PDP) Context Request message does not include an APN.

The Activate PDP Context Request message includes an APN, a PDN Type, Protocol Configuration Options and a Request Type.

It shall be noted that the APN and the Request Type are optional parameters. Particularly in the specification prior to Release 8, the Activate PDP Context Request message does not include the Request Type.

Both the APN and the Request Type included in the Activate PDP Context Request message may be used to indicate the information on the type of the local network, to which an access is requested by the UE, but in the case that the UE may access a plurality of local networks of the same type, a specific local network, to which an access is requested by the UE, may be definitely indicated by an APN if necessary.

If the UE newly establishes a PDN connection to a home network, the UE may set the Request Type in the Activate PDP Context Request message as Home Request.

If the UE newly establishes a PDN connection to a local Internet network, the UE may set the Request Type in the Activate PDP Context Request message as Internet Request.

In other words, when the Request Type is Home Request, the information of the local network, to which an access is requested by the UE, is information of the home network, to which an access is requested by the UE; and when the Request Type is Internet Request, the information of the local network, to which an access is requested by the UE, is information of the local Internet network, to which an access is requested by the UE.

It shall be noted that "Home Request" and "Internet Request" given in the embodiment of the invention are merely specific names representing the information of the local network, to which an access is requested by the UE, and of course the information of the local network, to which an access is requested by the UE, may alternatively be represented by other specific names.

2. The SGSN transmits a Radio Access Bearer (RAB) Assignment Request message upon reception of the Activate PDP Context Request message to request the HNB for establishment of an access bearer from the UE to the local network.

The Radio Access Bearer (RAB) Assignment Request message includes a RAB Identifier (RAB ID), and an uplink IP address and a Tunnel End Point Identifier (TEID) of a user plane interface (Iu-PS user plane interface) between the HNB and the SGSN, both of which are allocated by the SGSN to a Radio Access Bearer (RAB) identified by the RAB ID.

The SGSN shall inform the HNB that the bearer to be established for the UE is applicable to the local network, because the HNB can not forward data, transmitted from the UE to the local network, to the Serving Gateway (Serving GW) or the SGSN in the core network but shall forward the data to the local network upon reception of the data. Otherwise, the HNB shall forward data, transmitted from the UE to a mobile operator core network, to the Serving GW or the SGSN in the core network upon reception of the data if it is not necessary to forward the data to the local network.

Therefore, the SGSN may notify the HNB of the information of the local network, to which an access is requested by the UE, through the Radio Access Bearer (RAB) Assignment Request message to instruct the HNB to establish a bearer of the local network for the UE.

Since the local network may be a home network or a local Internet network. Furthermore, in the former case, one or more home networks are possible, therefore information of a specific local network to be accessed by the UE may be informed from the network side to the HNB.

A network (including a local network) may be identified by an APN, therefore the SGSN may inform the HNB that a bearer to be established is available to a specific local network in the following approaches.

In a first approach, the SGSN indicates information of a specific local network by setting an APN in the Radio Access Bearer (RAB) Assignment Request message.

In a second approach, if the HNB may be connected to only one home network or local Internet network, the SGSN may set an indicator in the Radio Access Bearer (RAB) Assignment Request message to indicate whether the home network or the local Internet network is connected, for example, 0 represents the home network and 1 represents the local Internet network.

3. The HNB transmits a Radio Bearer Setup message to the UE upon reception of the RAB Assignment Request message.

The Radio Bearer Setup message includes a Radio Bearer Identity (RB ID), which is the same as the RAB ID in the foregoing step 2.

4. The UE transmits a Radio Bearer Setup Complete message to the HNB upon reception of the Radio Bearer Setup message.

The establishment of the radio bearer accessing the local network has been completed between the HNB and the UE in the steps 3 and 4.

5. The HNB transmits a Radio Access Bearer (RAB) Assignment Response message to the SGSN upon reception of the Radio Bearer Setup Complete message.

The establishment of the bearer between the UE and the local network has been completed in the steps 2 to 5. Since the bearer between the UE and the local network does not involve any bearer of the core network, the bearer between the UE and the local network actually is the radio bearer between the UE and the HNB.

6. The SGSN transmits an Activate PDP Context Accept message to the UE upon reception of the RAB Assignment Response message.

The UE can be connected to the local network through the HNB and communicate with a device in the local network through the HNB after the foregoing Activate PDP Context procedure is performed.

The APN included in the Activate PDP Context Request message in the foregoing step 1 is introduced below in details.

The APN as mentioned in the embodiment of the invention includes four kinds of APNs, i.e., an APN defined in the prior art, and a Home network-Access Point Name (H-APN), a local Internet network-Access Point Name (I-APN) and a local network dedicated APN, defined in the embodiment of the invention. The local network dedicated APN includes a home network dedicated APN and a local Internet network dedicated APN.

The information of the home network, to which an access is requested by the UE, (including information on the type of the home network and information indicating a specific home network) may be indicated by an H-APN, and the information of the local Internet network, to which an access is requested by the UE, (including information on the type of the local Internet network and information indicating a specific local Internet network) may be indicated by an I-APN.

It shall be noted that the "H-APN" and the "I-APN" are merely specific identifiers, and of course other specific identifiers, e.g., a "Home-APN" or an "Internet-APN", may be adopted.

The local network dedicated APN is a specially defined APN with a plurality of fixed characters to indicate the information on the type of the local network and includes two types of a home network dedicated APN and a local Internet network dedicated APN.

For example, when the local network dedicated APN is "Home Network.3gppnetwork.org", it indicates that the local network is a home network; and when the local network dedicated APN is "Local Internet Network.3gppnetwork.org", it indicates that the local network is a local Internet network.

"Home Network.3gppnetwork.org" and "Local Internet Network.3gppnetwork.org" are merely exemplary, and other identifiers may be adopted.

When only one network is allowed for the local network of the same type to which the HNB is connected, the Request Type in the Activate Packet Data Protocol (PDP) Context Request message may be set as Home Request or Internet Request to indicate the local network, to which an access is requested by the UE, by indicating the type of local network, and in this case, the information on the APN included in the Activate PDP Context Request message may be ignored without being handled.

However, when a plurality of networks are allowed for the same type of the local network to which the HNB is connected and the same user equipment may access one or more local networks of the same type, the Activate PDP Context Request message may carry an APN to indicate a specific local network of that type. This APN may be an APN defined in the prior art or an H-APN, an I-APN or a local network dedicated APN defined in the embodiment of the invention, and identify the specific information of the local network, to which an access is requested by the UE.

It shall be noted that if the UE provides no APN or a wildcard "*" as an APN, it indicates that the UE provides only the information on the type of the local network, to which an access is requested by the UE, and therefore the SGSN may select a local network of that type for the UE. For example, the UE provides a wildcard "*" as an H-APN, and then the SGSN may select a home network for the UE, or the UE provides a wildcard "*" as an I-APN, and then the SGSN may select a local Internet network for the UE.

Four application scenarios of an APN in the embodiment of the invention are described below.

In a first scenario, when only one network is allowed for the same type of the local network to which the HNB is connected and the same user equipment may access only one local network of the same type (the UE may access concurrently networks of two types, but only one network of each type is accessible), if the Activate Packet Data Protocol (PDP) Context Request message does not include the Request Type, the Activate PDP Context Request message may carry an APN which may be an H-APN, an I-APN or a local network dedicated APN.

In this scenario, the H-APN, the I-APN or the local network dedicated APN corresponds directly to the local network of the corresponding type.

In a second scenario, when a plurality of networks are allowed for the same type of the local network to which the HNB is connected but the same user equipment may access only one local network of the same type, if the Activate Packet Data Protocol (PDP) Context Request message does not include the Request Type, the Activate PDP Context Request message may carry an APN to indicate the specific type of the local network, to which an access is requested by the UE, and possibly further indicate a specific local network of that type. The APN here may be an H-APN, an I-APN or a local network dedicated MN. If the APN included in the Activate PDP Context Request message provides only the information on the type of the local network, that is, the provided H-APN or I-APN is a wildcard "*", or the local network dedicated APN is provided, the SGSN may select a local network of the corresponding type for the UE.

In a third scenario, when a plurality of networks are allowed for the same type of the local network to which the HNB is connected and the user equipment may access a plurality of local networks of the same type (the UE may access concurrently local networks of a plurality of types, and a plurality of local networks of each type are concurrently accessible), if the Request Type in the Activate Packet Data Protocol (PDP) Context Request message is Home Request or Internet Request, that is, it indicates the type of the local network, an MN in the Activate PDP Context Request message indicates a specific local network of that type. The APN included in the Activate PDP Context Request message may be an MN defined in the prior art, or an H-APN or an I-APN defined in the embodiment of the invention. If the H-APN or I-APN provided by the UE is a wildcard "*", the SGSN may select a local network of the corresponding type for the UE.

In a fourth scenario, when a plurality of networks are allowed for the same type of the local network to which the HNB is connected and the user equipment may access a plurality of local networks of the same type, if the Activate Packet Data Protocol (PDP) Context Request message does not include the Request Type, the Activate PDP Context Request message may carry an APN to indicate a specific type of the local network, to which an access is requested by the UE, and possibly further indicate a specific local network of that type. Therefore, in this scenario, the APN included in the Activate PDP Context Request message may be an H-APN, an I-APN or a local network dedicated APN. If the APN included in the Activate PDP Context Request message provides only the information on the type of the local network, that is, the provided H-APN or I-APN is a wildcard "*", or provides the local network dedicated APN, the SGSN may select a local network of the corresponding type for the UE.

In summary, the APN included in the Activate PDP Context Request message and the Request Type included in the Activate PDP Context Request message may be combined as depicted in Table 1 below:

TABLE 1

| Application scenarios of Request Type | | Application scenarios of APN | |
|---|---|---|---|
| | | Home network | Local Internet network |
| Request Type is included | Home Request | No APN or APN in the prior art or H-APN | (Inapplicable) |
| | Internet Request | (Inapplicable) | No APN or APN in the prior art or I-APN |
| No Request Type | | H-APN or home network dedicated APN | I-APN or local Internet network dedicated APN |

Particularly, "No APN" in Table 1 means that no APN is included in the Activate PDP Context Request message.

In order to distinguish the local network Access Point Names of H-APN and I-APN from the Wireless area network APN (W-APN) and APN in the prior art, the formats of the H-APN and the I-APN may be defined.

The H-APN and the I-APN are constructed as follows.

The H-APN may be composed of two parts.

A first part is a network identifier of a home network, to which an access is requested by the UE, (The H-APN Network Identifier), and this part is requisite.

A second part is an identifier of a Public Land Mobile Network (PLMN) corresponding to the home network, to which an access is requested by the UE, (The H-APN Operator Identifier), i.e., the identifier of an operator. This part is optional.

The HNB may be connected concurrently with a plurality of PLMNs.

The format of The H-APN Operator Identifier is "h-apn.epc.mnc<MNC>.mcc<MCC>.3gppnetwork.org".

Particularly, the character identifiers "mnc" and "mcc" indicate that digits collocated with <MNC> and <MCC> succeeding to the character identifiers represent a Mobile Network Code (MNC) and a Mobile Country Code (MCC) respectively. The MCC is composed of three digits, e.g., 345, and the MNC is composed of two or three digits, and both of them have been described in details in the TS23.003 standard.

For example, when the MCC is 345 and the MNC is 12, The H-APN Operator Identifier is "h-apn.epc.mnc012.mcc345.3gppnetwork.org".

Similarly, the I-APN may be composed of two parts.

A first part is an network identifier of a local Internet network, to which an access is requested by the UE, (The I-APN Network Identifier), and this part is requisite.

A second part is an identifier of a Public Land Mobile Network (PLMN) corresponding to the local Internet network, to which an access is requested by the UE, (The I-APN Operator Identifier), i.e., the identifier of an operator. This part is optional.

If the local network access point name (H-APN or I-APN) does not include any identifier of a public land mobile network corresponding to the local network, the local network access point name can not be distinguished at the network side from the an APN in the prior art, because the format of the local network access point name without any identifier of a public land mobile network is the same as the format of the APN in the prior art and can not be distinguished from the APN in the prior art.

The APN may be encoded in the message as depicted in Table 2 below:

TABLE 2

| 8 | 7 | 6 | 5 | 4 | 3 | 2 | 1 | |
|---|---|---|---|---|---|---|---|---|
| Information Element Identifier (IEI) identifying the type of an access point name (Access point name IEI) | | | | | | | | Octet 1 |
| The length of the contents of an access point name (Length of access point name contents) | | | | | | | | Octet 2 |
| The value of an access point name (Access point name value) | | | | | | | | Octet 3 |
| ... | | | | | | | | ... |
| | | | | | | | | Octet n |

For the APN defined in the prior art, the access point name IEI has one value, and since the H-APN and the I-APN are proposed in the embodiment of the invention, the number of values of the access point name IEI may be increased so that the H-APN and the I-APN may be represented respectively.

For example, the access point name IEI with the value of 51 represents the APN defined in the prior art (and also the local network dedicated APN defined in the embodiment of the invention); the access point name IEI with the value of 52 represents the H-APN; and the access point name IEI with the value of 53 represents the I-APN.

As can be apparent, unlike the H-APN and the I-APN, only parameter configurations of the user equipment and the network shall be modified for the local network dedicated APN without modifying the access point name IEI, that is, without modifying any protocol, which is more simple and convenient. The local network dedicated APN is applicable throughout the 3GPP specification to identify the type of a local network.

Therefore, the network side can know from the value of the access point name IEI whether the UE requests for an access to a home network, a local Internet network or a mobile operator core network.

The H-APN and the I-APN of the home network with a subscription in an HSS may be a wildcard, that is, the H-APN and the I-APN stored in the HSS may be "*".

In summary, when the UE initiates a connection to the home network through the Activate Packet Data Protocol Context procedure, the Activate PDP Context Request message transmitted from the UE to the network side carries an APN defined in the prior art, or an H-APN, an I-APN or a local network dedicated APN defined in the embodiment of the invention, to indicate the information of the local network, to which an access is requested by the UE.

A system according to an embodiment of the invention is described below.

Figure 4:
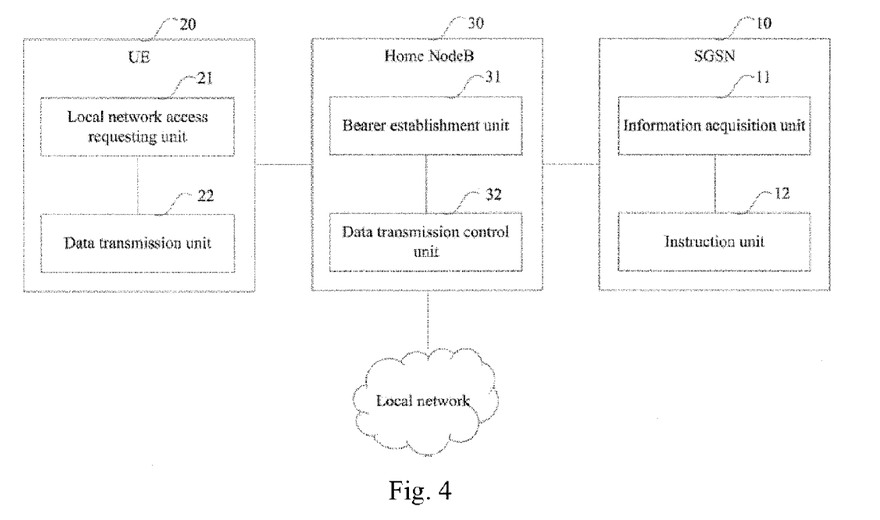
FIG. 4 is a schematic structural diagram of a communication system according to an embodiment of the invention.

Referring to FIG. 4, a communication system according to an embodiment of the invention includes a Serving General Packet Radio Service (GPRS) Support Node (SGSN) 10 and a home NodeB 30.

The SGSN 10 is configured to acquire information of a local network, to which an access is requested by a User Equipment (UE) 20, through an Activate Packet Data Protocol Context Request procedure initiated by the UE 20, and instruct the home NodeB 30 according to the information of the local network, to which an access is requested by the UE 20, to establish a bearer of the local network for the UE 20.

The home NodeB 30 is configured to establish a radio bearer of the local network for the UE 20 in response to the instruction of the SGSN 10 to enable an access of the UE 20 to the local network.

Preferably, the SGSN 10 includes:

an information acquisition unit 11 configured to receive an Activate Packet Data Protocol (PDP) Context Request message forwarded by the home NodeB 30, and acquire information on the type of the local network, to which an access is requested by the UE 20, according to a Request Type and/or information on an Access Point Name (APN) of the local network included in the Activate PDP Context Request message; and an instruction unit 12 configured to instruct the home NodeB 30 according to the information on the type of the local network, to which an access is requested by the UE 20, to establish a bearer of the local network for the UE 20.

Preferably, when the information on the Access Point Name (APN) of the local network included in the Activate PDP Context Request message is a local network dedicated APN or the Request Type included in the Activate PDP Context Request message indicates the information on the type of the local network, to which an access is requested by the UE, the information of the local network, to which an access is requested by the UE 20, acquired by the information acquisition unit 11 from the Activate PDP Context Request message is the information on the type of the local network, to which an access is requested by the UE 20.

Preferably, the instruction unit 12 selects the local network for the UE 20 according to the information on the type of the local network, to which an access is requested by the UE 20, and instructs the home NodeB 30 to establish a bearer to the local network for the UE 20.

Preferably, the information on the APN of the local network is a home network APN or a local Internet network APN; and the information acquisition unit 11 determines that the UE 20 requests for an access to a home network and acquires information on the access point name of the home network, to which an access is requested by the UE 20, when an Information Element Identifier (IEI) for identifying the type of an access point name in the information on the APN of the local network takes a value indicating that the UE 20 requests for an access to the home network, and determines that the UE 20 requests for an access to a local Internet network and acquires information on the access point name of the local Internet network, to which an access is requested by the UE 20, when the IEI takes a value indicating that the UE 20 requests for an access to the local Internet network.

Preferably, the home NodeB 30 includes:

a bearer establishment unit 31 configured to establish the radio bearer to the local network for the UE 20 in response to the instruction, transmitted from the SGSN 10, to establish a bearer to the local network for the UE 20; and a data transmission control unit 32 configured to control transmission of data between the UE 20 and the local network, to which an access is requested by the UE 20, through the radio bearer.

Preferably, the user equipment 20 includes:

a local network access requesting unit 21 configured to transmit the information of the local network, to which an access is requested by the user equipment, to the home NodeB 30 through the Activate Packet Data Protocol Context Request procedure initiated by the user equipment; and a data transmission unit 22 configured to perform data transmission with the local network over the radio bearer of the local network, established by the home NodeB 30 for the user equipment 20, under the control of the home NodeB 30.

The local network access requesting unit 21 transmits the information of the local network, to which an access is requested by the user equipment, to the home NodeB 30 through a Request Type or information on an Access Point Name (APN) of the local network included in an Activate Packet Data Protocol (PDP) Context Request message transmitted to the network side.

In summary, the embodiments of the invention provide a solution for controlling an access of a UE to a local network through a home NodeB. In an Activate Packet Data Protocol Context Request procedure initiated by the UE, in the case that the UE can indicate a specific local network, to which an access is requested, simply by transmitting information on the type of the local network, or in the case that the UE simply indicates the information on the type of the local network and a specific local network of that type to be accessed can be selected at the network side, if a newly established PDN connection is to a home network, the UE sets a Request Type in a transmitted Activate PDP Context Request message as Home Request, or does not include the Request Type in the transmitted Activate PDP Context Request message and sets therein an APN as a home network dedicated APN. If a PDN connection to be established as requested by the UE is to a local Internet network, the UE sets the Request Type in the transmitted Activate PDP Context Request message as Internet Request, or does not include the Request Type in the transmitted Activate PDP Context Request message and sets therein an APN as a local Internet network dedicated APN. When an SGSN receives the Activate PDP Context Request message, in which the Request Type is Home Request or Internet Request, or receives the home network dedicated APN or the local Internet network dedicated APN, the SGSN does not select a PDN Gateway (PDN GW) in a core network and does not transmit a Create Default Bearer Request message to a Serving GW in the core network. In transmission of an RAB Assignment Request message to the HNB, the SGSN informs in the RAB Assignment Request message the HNB that a bearer to be established is applicable to the specific local network, so that uplink data travels merely from the UE to the HNB and then to the home network, and downlink data travels from the home network to the HNB and then to the UE. In the case that it is not sufficient for the UE to transmit only the information on the type of the local network to indicate the specific local network, to which an access is requested, a specific local network, to which an access is requested by the UE, can be indicated by an APN (H-APN or I-APN) of the local network, which may be transmitted from the UE to the network side in the Activate PDP Context Request message, and an access of the UE to the local network can be controlled at the network side according to the APN.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for controlling an access of a User Equipment, UE, to a network, comprising:

acquiring, by a Serving General Packet Radio Service, GPRS, Support Node, SGSN, information of a local network, to which an access is requested by the UE, through an Activate Packet Data Protocol Context procedure initiated by the UE;

instructing, by the SGSN, a home NodeB according to the information of the local network, to which an access is requested by the UE, to establish a bearer of the local network for the UE; and establishing, by the home NodeB, a radio bearer of the local network for the UE in response to the instruction of the SGSN to enable an access of the UE to the local network.

2. The method of claim 1, wherein the information of the local network, to which an access is requested by the UE, is information on a type of the local network, to which an access is requested by the UE.

3. The method of claim 2, wherein the step of acquiring by the SGSN the information of the local network, to which an access is requested by the UE, through the Activate Packet Data Protocol Context procedure initiated by the UE comprises:
receiving, by the SGSN, an Activate Packet Data Protocol, PDP, Context Request message forwarded by the home NodeB, and acquiring the information on the type of the local network, to which an access is requested by the UE, according to a Request Type and/or information on an Access Point Name, MN, of the local network included in the Activate PDP Context Request message.

4. The method of claim 2, wherein the step of instructing by the SGSN the home NodeB according to the information of the local network, to which an access is requested by the UE, to establish a bearer of the local network for the UE comprises:
selecting, by the SGSN, the local network for the UE according to the information on the type of the local network, to which an access is requested by the UE, and instructing the home NodeB to establish a bearer to the selected local network for the UE.

5. The method of claim 1, wherein the information of the local network, to which an access is requested by the UE, is information on an Access Point Name, APN, of the local network, to which an access is requested by the UE.

6. The method of claim 5, wherein the step of acquiring by the SGSN the information of the local network, to which an access is requested by the UE, through the Activate Packet Data Protocol Context procedure initiated by the UE comprises:
receiving, by the SGSN, an Activate Packet Data Protocol, PDP, Context Request message forwarded by the home NodeB, and acquiring therefrom the information on the APN of the local network, to which an access is requested by the UE.

7. The method of claim 5, wherein the APN is a home network APN, a local Internet network APN, a home network dedicated APN or a local Internet network dedicated APN.

8. The method of claim 7, wherein when the APN is the home network APN or the local Internet network APN, the information on the APN of the local network comprises:
a network identifier of the local network, to which an access is requested by the UE; or
a network identifier of the local network, to which an access is requested by the UE, and an identifier of a Public Land Mobile Network, PLMN, corresponding to the local network.

9. The method of claim 7, wherein when the APN is the home network APN or the local Internet network APN, if an Information Element Identifier, MI, for identifying a type of the access point name in the information on the APN of the local network takes a value indicating that the UE requests for an access to a home network, determining, by the SGSN, that the UE requests for an access to the home network and acquiring the information on the access point name of the home network, to which an access is requested by the UE, and if the IEI takes a value indicating that the UE requests for an access to a local Internet network, determining, by the SGSN, that the UE requests for an access to the local Internet network and acquiring the information on the access point name of the local Internet network, to which an access is requested by the UE.

10. The method of claim 1, wherein the step of instructing by the SGSN the home NodeB according to the information of the local network, to which an access is requested by the UE, to establish a bearer of the local network for the UE comprises:
generating, by the SGSN, a Radio Access Bearer, RAB, Assignment Request message according to the information of the local network, to which an access is requested by the UE, and instructing the home NodeB through the RAB Assignment Request message to establish a bearer of the local network for the UE.

11. A user equipment, comprising:
a local network access requesting unit configured to transmit information of a local network, to which an access is requested by the user equipment, to a home NodeB through an Activate Packet Data Protocol Context procedure initiated by the user equipment; and
a data transmission unit configured to perform data transmission with the local network over a radio bearer of the local network, established by the home NodeB for the user equipment, under the control of the home NodeB.

12. The user equipment of claim 11, wherein the local network access requesting unit transmits the information of the local network, to which an access is requested by the user equipment, to the home NodeB through a Request Type or information on an Access Point Name, APN, of the local network included in an Activate Packet Data Protocol, PDP, Context Request message transmitted to the network side.

13. An SGSN, comprising:
an information acquisition unit configured to acquire information of a local network, to which an access is requested by a User Equipment, UE, through an Activate Packet Data Protocol Context procedure initiated by the UE; and
an instruction unit configured to instruct a home NodeB according to the information of the local network, to which an access is requested by the UE, to establish a bearer of the local network for the UE.

14. The SGSN of claim 13, wherein the information acquisition unit is configured to receive an Activate Packet Data Protocol, PDP, Context Request message forwarded by the home NodeB, and acquire the information of the local network, to which an access is requested by the UE, according to a Request Type and/or information on an Access Point Name, APN, of the local network included in the Activate PDP Context Request message; and
the instruction unit is configured to instruct the home NodeB according to the information of the local network, to which an access is requested by the UE, to establish a bearer of the local network for the UE.

15. The SGSN of claim 14, wherein when the information on the APN of the local network included in the Activate PDP Context Request message is a local network dedicated APN or the Request Type included in the Activate PDP Context Request message indicates information on a type of the local network, to which an access is requested by the UE, the information of the local network, to which an access is requested by the UE, acquired by the information acquisition unit from the Activate PDP Context Request message is the information on the type of the local network, to which an access is requested by the UE.

16. The SGSN of claim 15, wherein the instruction unit selects the local network for the UE according to the information on the type of the local network, to which an access is requested by the UE, and instructs the home NodeB to establish a bearer to the selected local network for the UE.

17. The SGSN of claim 14, wherein the APN is a home network APN or a local Internet network APN; and
   the information acquisition unit determines that the UE requests for an access to a home network and acquires the information on the access point name of the home network, to which an access is requested by the UE, when an Information Element Identifier, IEI, for identifying a type of the access point name in the information on the APN of the local network takes a value indicating that the UE requests for an access to the home network, and determines that the UE requests for an access to a local Internet network and acquires the information on the access point name of the local Internet network, to which an access is requested by the UE, when the IEI takes a value indicating that the UE requests for an access to the local Internet network.

* * * * *